(12) United States Patent
Yang et al.

(10) Patent No.: US 12,377,646 B2
(45) Date of Patent: Aug. 5, 2025

(54) METHOD AND DEVICE FOR PEELING OFF A FILM COVERED ON AN OBJECT

(71) Applicant: PROLOGIUM TECHNOLOGY CO., LTD., Taoyuan (TW)

(72) Inventors: Szu-Nan Yang, Taoyuan (TW); Chia-Chien Hung, Taoyuan (TW); Jian-Hua Su, Taoyuan (TW)

(73) Assignee: PROLOGIUM TECHNOLOGY CO., LTD., Taoyuan (TW)

( * ) Notice: Subject to any disclaimer, the term of this patent is extended or adjusted under 35 U.S.C. 154(b) by 43 days.

(21) Appl. No.: 18/132,618

(22) Filed: Apr. 10, 2023

(65) Prior Publication Data

US 2023/0321971 A1    Oct. 12, 2023

(30) Foreign Application Priority Data

Apr. 11, 2022  (TW) .................................. 111113642

(51) Int. Cl.
 B32B 43/00    (2006.01)
(52) U.S. Cl.
 CPC ....... B32B 43/006 (2013.01); *Y10T 156/1174* (2015.01); *Y10T 156/195* (2015.01)
(58) Field of Classification Search
 CPC ............. B32B 43/006; Y10T 156/1174; Y10T 156/195
 See application file for complete search history.

(56) References Cited

U.S. PATENT DOCUMENTS

| 6,227,276 B1* | 5/2001 | Kim .................... B29C 63/0013 156/247 |
| 2002/0094760 A1* | 7/2002 | Lim .................... B29C 63/0013 451/41 |
| 2007/0026641 A1 | 2/2007 | Ametani |
| 2008/0213562 A1 | 9/2008 | Przybylinski |
| 2021/0347161 A1* | 11/2021 | Bae ........................ B32B 37/18 |

FOREIGN PATENT DOCUMENTS

| CN | 108749273 A | 11/2018 |
| CN | 110509657 A | 11/2019 |
| CN | 209972974 U | 1/2020 |

(Continued)

OTHER PUBLICATIONS

Taiwan Intellectual Property Office, 1st office action dated Sep. 21, 2022.

(Continued)

*Primary Examiner* — Philip C Tucker
*Assistant Examiner* — Nickolas R Harm
(74) *Attorney, Agent, or Firm* — WPAT, PC

(57) ABSTRACT

A film peeling method is disclosed to peel off a film covered on the surface of an object. The method includes the steps of: setting a fulcrum located at outer side of the object; setting a lift-off position on the film; and picking up the film from the lift-off position with the fulcrum as the axis, and applying a circular traction force with a variable radius on the film for peeling off the film from the object. The film peeling method can peel off the film covered on the surface of the object by different peeling stages, to reduce the peeling path and reduce the force required for peeling the film, thereby reducing the peeling time and improving the peeling efficiency.

10 Claims, 9 Drawing Sheets

(56) References Cited

FOREIGN PATENT DOCUMENTS

| | | |
|---|---|---|
| CN | 113859691 A | 12/2021 |
| CN | 215794971 U | 2/2022 |
| JP | 2001186820 A | 7/2001 |
| JP | 2009-40594 A | 2/2009 |
| JP | 2010-37076 A | 2/2010 |
| JP | 2010037076 A | 2/2010 |
| TW | 201605637 A | 2/2016 |

OTHER PUBLICATIONS

Japan Patent Office office action dated Jul. 2, 2024.
Korean Intellectual Property Office (KIPO), Office Action, dated Nov. 22, 2024.
Xin et al. "Improved Design and Experiment of Collector for Corn Whole Plastic Film Mulching on Double Ridges", Nov. 2018, Transactions of the Chinese Society for Agricultural Machinery.
China Patent Office "Office Action" issued on May 29, 2025, China.

\* cited by examiner

METHOD AND DEVICE FOR PEELING OFF A FILM COVERED ON AN OBJECT

BACKGROUND OF THE INVENTION

1. Field of the Invention

The present invention relates to a film peeling method and device, more specifically, relates to a method and device that can be used to remove various kinds of plane film materials covered on objects.

2. Description of the Prior Art

With the rapid development of industry, equipment automation has been widely used in the production and manufacturing industry. To avoid potential damage to the semi-finished goods, it may be necessary to include some additional processes in the manufacturing process. For example, in the display panel industry, the surface of the display panels will be covered with a protective film to avoid scratching of the panels during the delivery process when producing display panels (e.g., flat panels, LED screens, LCD screens, etc.). The protective film is removed when the display panel needs to be further processed or be installed into another device afterwards. Therefore, the production equipment for display panels usually includes a peeling device to remove the protective film from the display panels.

For most existing peeling equipment, the protective film is peeled along a straight path, for example, a diagonal or 45-degree straight path. However, after the peeling mechanism of the peeling equipment removes the protective film of the object in a straight path, the peeling mechanism must return to its original position along the peeling path to perform the next peeling. In other words, to finish the peeling and be ready for the next peeling, the moving path of the peeling mechanism is twice the diagonal length of the object. Therefore, the peeling equipment needs to provide more space for the peeling mechanism to operate, and thus the size of the peeling equipment is huge. Moreover, since the peeling mechanism operates along a straight path, the peeling mechanism generates a large force torque, which may cause a move or even deformation of the semi-finished goods. Furthermore, the product move and deformation may be severe when the size or aspect ratio of the semi-finished goods is large. In addition, after the peeling mechanism peels the protective film along the peeling path and returns to its original position along the peeling path, the peeling equipment may need to provide a dropping path for the peeling mechanism to drop the protective film along the dropping path, thereby increasing the total path and reducing operating efficiency.

SUMMARY OF THE INVENTION

Therefore, one category of the present invention is to provide a film peeling method to solve the problems of the prior art.

In one embodiment of the present invention, the method is applied to peel a film covered on the surface of an object. The method includes the steps of: a first step of setting a fulcrum located at an outer side of the object; a second step of setting a lift-off position on the film; and a third step of picking up the film from the lift-off position with the fulcrum as the axis, and applying a circular traction force with a variable radius on the film for peeling the film.

The third step may further include the following steps. Setting a first force arm which equals to the distance between the fulcrum and the lift-off position, and setting a second force arm which equals to the distance between the fulcrum and a separation position, where the second force arm is shorter than the first force arm; applying the circular traction force with a decreasing variable radius on the film from the lift-off position with the fulcrum as the axis, where the decreasing variable radius changes from the first force arm to the second force arm; and applying the circular traction force with an increasing variable radius on the film with the fulcrum as the axis to completely peel off the film from the object, where the increasing variable radius changes from the second force arm to the first force arm.

The method may further include the following step. Applying the circular traction force with a fixed radius on the film and with the second force arm with the fulcrum as the axis before applying the circular traction force with the increasing variable radius on the film.

The method may further include the following step. Dropping the peeled-off film with the first force arm and with the fulcrum as the axis.

The lift-off position and the separation position are located at two corners of the film next to the fulcrum.

The present invention provides a film peeling device according to the aforementioned method to solve the problems of the prior art.

The device includes a carrying platform and a film peeling assembly. The carrying platform is configured for carrying an object with a film covered thereon. The film peeling assembly includes a rotating shaft, a variable radius rotating arm and a peeling component. The rotating shaft defines an axis for the variable radius rotating arm to rotate around. A near end of the variable radius rotating arm is connected to the rotating shaft, and a far end of the variable radius rotating arm is connected to the peeling component configured to peel off the film. The variable radius rotating arm is driven by the rotating shaft to rotate around the axis, so as to drive the peeling component to apply a circular traction force with a variable radius to peel off the film from the object.

The variable radius rotating arm includes a main body and an expansion rod mechanically coupled to a first end of the main body.

The device further includes a counterweight block mechanically coupled to a second end of the main body.

The variable radius may change between a first rotating radius and a second rotating radius; the second rotating radius is shorter than the first rotating radius. The variable radius rotating arm rotates with the first rotating radius and the second rotating radius respectively to generate a first circular path and a second circular path. The peeling component moves in the first circular path, the second circular path, and then the first circular path in sequence to completely peel off the film from the object. The lift-off position is located on the first circular path.

The peeling component picks up the film when the angle between the circular traction force and the film is approximately 45 degrees. Then the peeling component continues the peeling and changes its moving path from the first circular path to the second circular path. When the angle between the circular traction force and the film is approximately 135 degrees, the peeling component continues the peeling and changes its moving path from the second circular path to the first circular path until the film is completely peeled off from the object.

The peeling component may include a fixed finger, a movable finger and a cylinder. The fixed finger is arranged opposite to the movable finger. The movable finger can move toward the fixed finger so the peeling component can securely grip the film.

Alternatively, the peeling component may include a sucker for sucking up the film.

Alternatively, the peeling component may include a gripper for gripping the film.

In summary, the film peeling method and device of the embodiments according to the present invention can use different rotation radius and circular paths in different peeling stages to peel off the film covered on the object, so as to shorten the peeling path, reduce the force required for peeling the film and the risk of product displacement/deformation. Thus, the peeling time could be reduced and the peeling efficiency could be improved. Moreover, in addition to peeling off the film from the object, the device could also drop the peeled-off film along the same circular path. With such arrangement, the total path could be shortened, the configuration of the components could be more compact, thereby the peeling time and the operating space could both be reduced.

BRIEF DESCRIPTION OF THE APPENDED DRAWINGS

DETAILED DESCRIPTION OF THE INVENTION

For the sake of the advantages, spirits and features of the present invention to be understood more easily and clearly, the embodiments according to the present invention will be illustrated with detailed description and diagrams in the following. It is worth noting that these embodiments are merely representative embodiments of the present invention, and the specific methods, devices, conditions, materials and the like are not limited to the embodiments of the present invention. Moreover, the devices in the figures are only used to illustrate their corresponding positions and interactions, and are not drawings according to their actual size and proportion.

In the description of this specification, descriptions with reference to terms "one embodiment", "another one embodiment" or "parts of specific embodiments" etc. mean the specific features, structures, materials or characteristics described in conjunction with the embodiment are included in at least one embodiment of the present invention. In this specification, the schematic representations of the above terms do not necessarily refer to the same embodiment. Moreover, the described specific features, structures, materials or characteristics can be combined in any one or more embodiments in a suitable manner.

Figure 1:
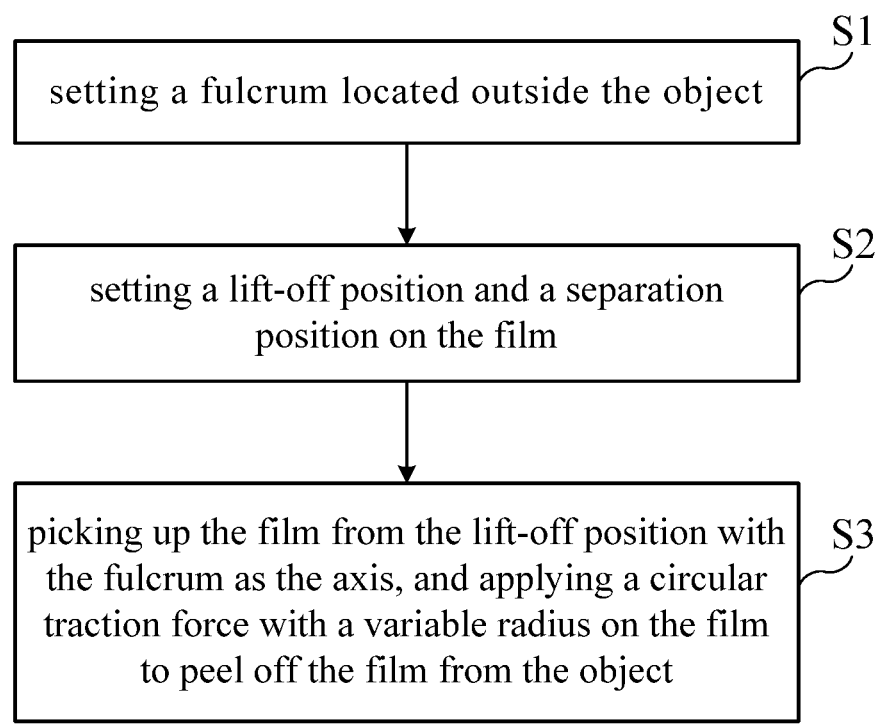
FIG. 1 is a flow chart illustrating a method for peeling off a film covered on an object according to one embodiment of the present invention.
Figure 2:
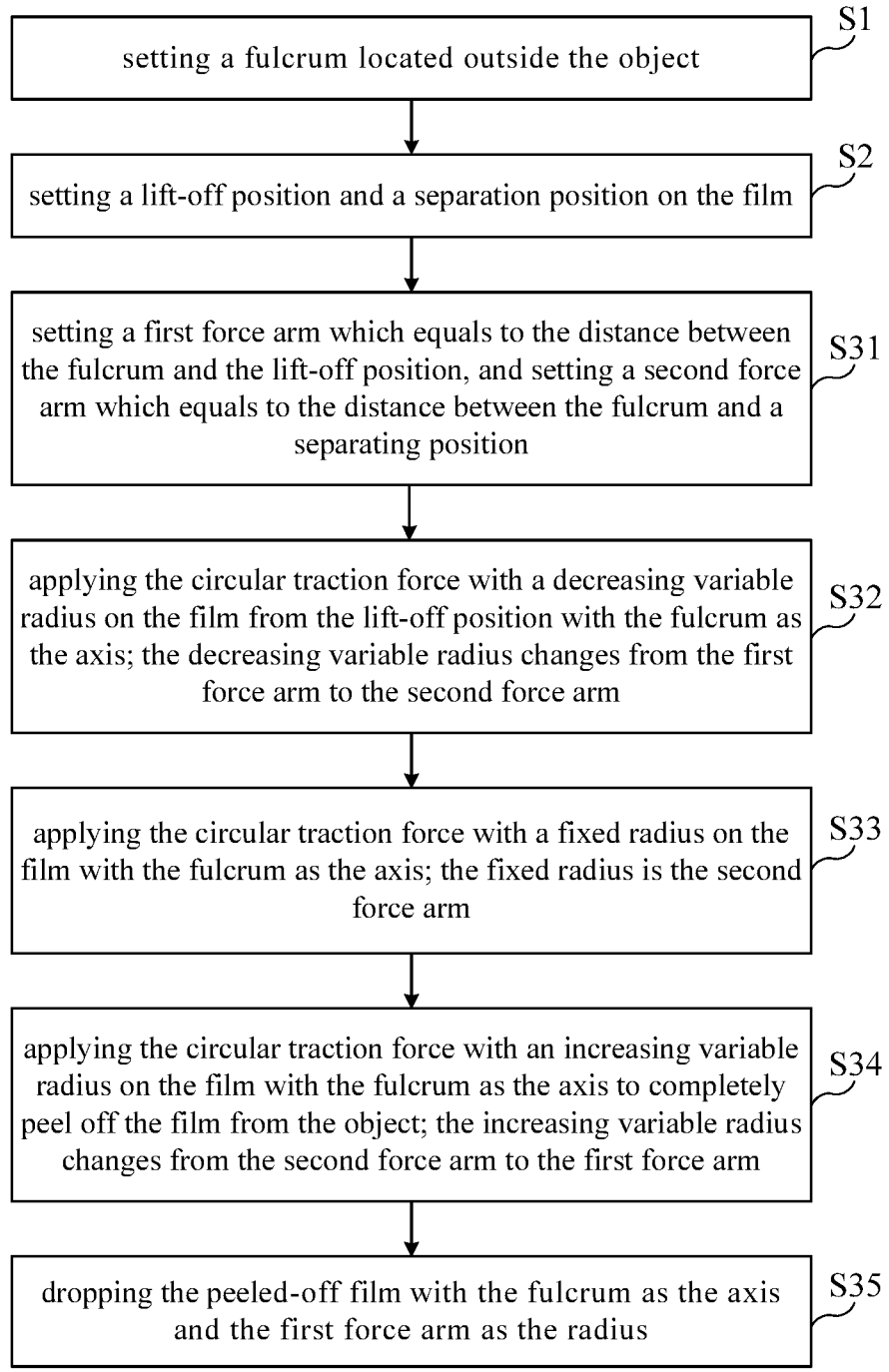
FIG. 2 is a flow chart illustrating the more detailed steps of the method in FIG. 1.
Figure 3A:
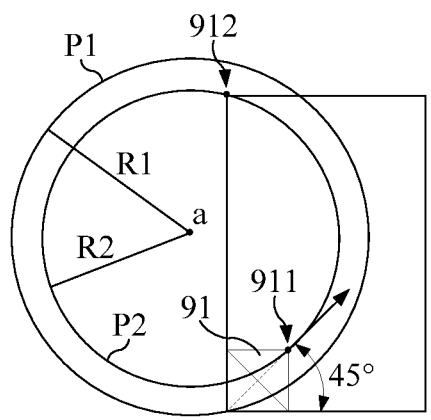
FIG. 3A to FIG. 3E are flow schematic diagrams illustrating the method for peeling off a film covered on an object according to one embodiment of the present invention.

Please refer to FIG. 1, FIG. 2 and FIG. 3A to FIG. 3E. FIG. 1 is a flow chart illustrating a method for peeling off a film covered on an object according to one embodiment of the present invention. FIG. 2 is a flow chart illustrating the more detailed steps of the method in FIG. 1. FIG. 3A to FIG. 3E are drawings illustrating the method for peeling off a film covered on an object according to the embodiment. As shown in FIG. 1, FIG. 2 and FIG. 3A, in this embodiment, the method includes the following steps. Step S1: setting a fulcrum (a) located outside the object 9; step S2: setting a lift-off position and a separation position on the film 91; and step S3: picking up the film 91 from the lift-off position with the fulcrum as the axis, and applying a circular traction force with a variable radius on the film 91 to peel off the film 91 from the object 9.

The step S3 of the method in FIG. 1 may further include the following steps. Step S31: setting a first force arm R1 which equals to the distance between the fulcrum (a) and the lift-off position, and setting a second force arm R2 which equals to the distance between the fulcrum (a) and a separation position; the second force arm R2 is shorter than the first force arm R1. Step S32: applying the circular traction force with a decreasing variable radius on the film 91 from the lift-off position with the fulcrum (a) as the axis; the decreasing variable radius changes from the first force arm R1 to the second force arm R2. Step S34: applying the circular traction force with an increasing variable radius on the film 91 with the fulcrum (a) as the axis, so as to completely peel off the film 91 from the object 9; the increasing variable radius changes from the second force arm R2 to the first force arm R1. In step S34, the variable radius is increased to the first force arm R1, which is larger than the second force arm R2, so the peeling path is higher than the boundary of the object 9. With such arrangement, the film 91 could be prevented from sticking back to the object 9, and could be completely peeled off from the object 9.

The method may further include a step S33 between the step S32 and step S34. The step S33 is to apply a circular traction force with a fixed radius on the film 91 with the fulcrum (a) as the axis; the fixed radius is the second force arm R2. The duration of the step S33 may be determined depending on the aspect ratio of the film and the adhesion capacity between the film 91 and the object 9.

After the step S34, the method continues to proceed to step S35: dropping the peeled-off film 91 with the fulcrum (a) as the axis and with the first force arm R1 as the radius. Moreover, after dropping the peeled-off film 91, the repositioning may be finished with the first force arm R1 as the rotating radius and with the fulcrum (a) as the axis, so the next film peeling process could be started.

In the above steps, the fulcrum (a) does not changed during all the steps. All steps are performed along a circular path with a variable radius around the fulcrum (a), and the variable radius changes between a first force arm R1 and a second force arm R2. More particularly, when picking up the film 91, the variable radius is the first force arm R1. Then when starting to peel the film, the variable radius changes from the first force arm R1 to the second force arm R2, where the second force arm R2 is shorter than the first force arm R1. Then the peeling continues, the variable radius changes from the second force arm R2 back to the first force arm R1 and the film 91 is completely peeled off from the object 9.

The object 9 may be an optical panel, a polarizer, a battery substrate or other panel product with a protective film. The film 91 may be a release film, a Mylar film or a protective film of various plane panel products. The size of the film 91 may correspond to the size of the object 9, and the film 91 is located on the upper surface of the object 9. The film 91 is set up with a lift-off position and a separation position. In this embodiment, see FIG. 3A-3C, the lift-off position and the separation position are located at two corners of the film 91 next to the side of the fulcrum (a). The lift-off position and the separation position are located on the bottom end 911 and the top end 912 respectively, so the film 91 may be picked up (lift-up) and separated from the object 9 with less force. It should be noted that the circular traction force applied on the bottom end 911 is aligned with the arc tangential direction of the circular path during the peeling process. With such arrangement, the force required for peeling off the film 91 on the object 9 could be less than the force required for peeling off the film on the object along a straight path.

Figure 3B:
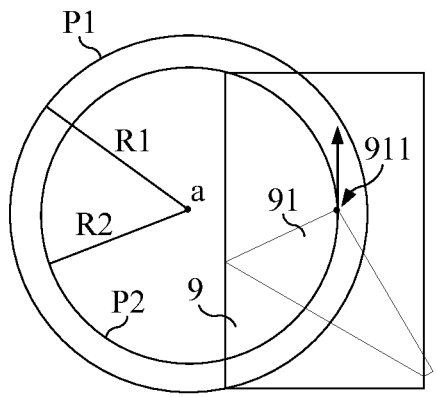
Figure 3C:
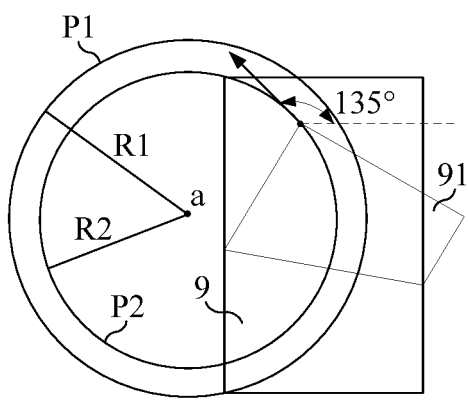
Figure 3D:
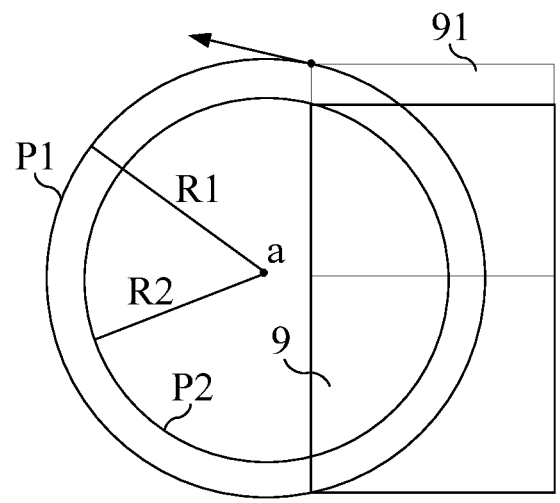
Figure 3E:
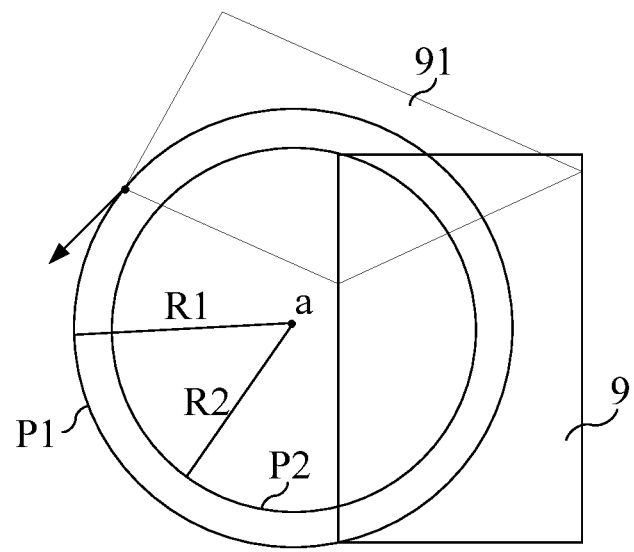

The film peeling process of the method according to the embodiment is illustrated from FIG. 3A to FIG. 3E in sequence. As shown in FIG. 3A, the method starts with picking up (lifting-up) the film 91 from a first corner 911 of the film 91 covered on the object 9 with the first force arm R1. After picking up the film 91, the circular traction force is applied to the film 91 with a decreasing variable radius changing from the first force arm R1 to a second force arm R2 to continue peeling the film 91. As shown in FIG. 3B, after the variable radius is changed from the first force arm R1 to the second force arm R2, the circular traction force is continuously applied to the film 91 with the second force arm R2. Then, as shown in FIG. 3C and FIG. 3D, the circular traction force is applied to the film 91 with the increasing variable radius changing from the second force arm R2 to the first force arm R1 to peel the film. Finally, as shown in FIG. 3E, after the variable radius is changed from the second force arm R2 to the first force arm R1, the circular traction force is continuously applied to the film 91 with the first force arm R1, to completely peel off the film 91 from the object 9 at the separation position.

In more details, the above-mentioned film picking up step includes applying a pick-up force on the lift-off position (e.g. the first corner 911) of the film 91 with the first force arm R1 and with the fulcrum (a) as the axis, and making the circular traction force pick up the film on the lift-off position with an angle between the circular traction force and the film approximately 45 degrees, so as to make the peeling force torque smaller and avoid displacement or deformation of the object 9 due to strong traction force. After the first force arm R1 changes to the second force arm R2, the circular traction force is applied on the film 91 with the second force arm R2 as a fixed radius and with the fulcrum (a) as the axis. When the film 91 is peeled from the bottom 911 to approximately the center of the film 91, the peeling path is located at ¼ of the circular path. Since the circular traction force contains a fraction, the maximum peeling force is generated throughout the film peeling process. Then, when the angle between the circular traction force and the film 91 at the bottom 911 is approximately 135 degrees, the variable radius changes from the second force arm R2 to the first force arm R1, to make the peeling path higher than the boundary of the object 9 to prevent the film 91 from sticking back to the object 9 and the film 91 could be completely removed from the object 9. Therefore, the method for peeling off a film covered on an object of the embodiment can peel off the film 91 on the surface of the object 9 by different peeling stages, to reduce the peeling path and reduce the force required for peeling the film, thereby reducing the peeling time and improving the peeling efficiency.

Figure 4:
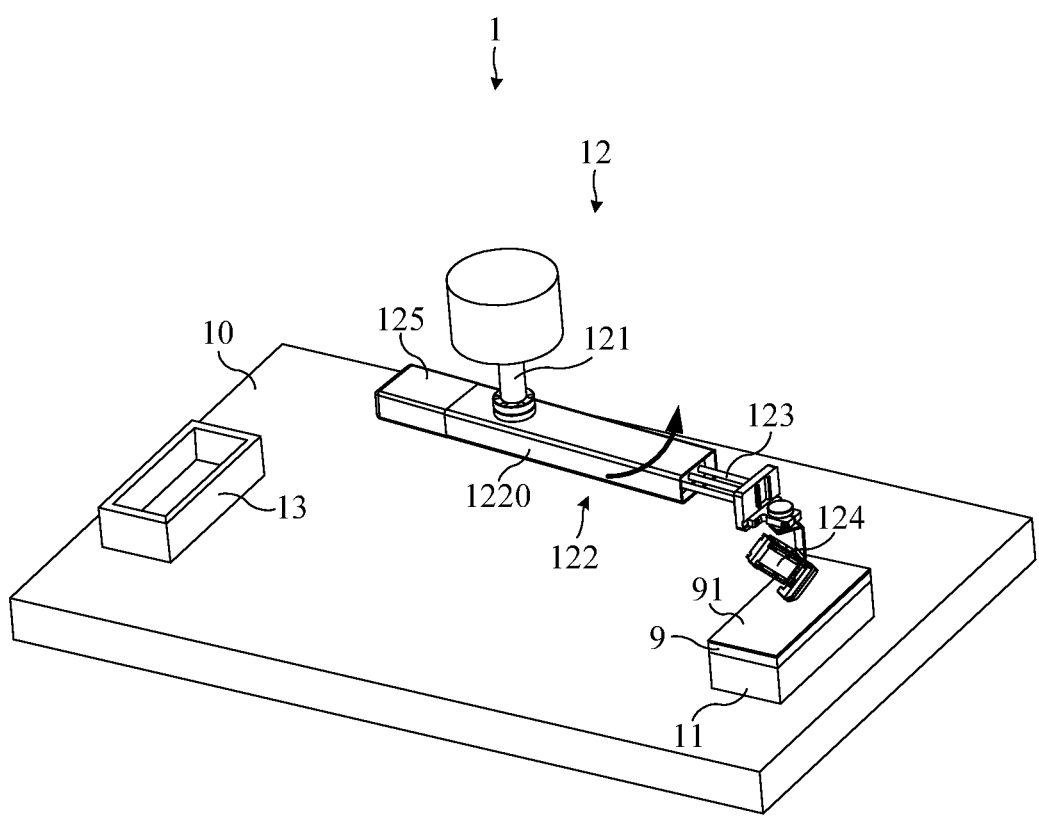
FIG. 4 is a perspective view illustrating a device for peeling off a film covered on an object according to one embodiment of the present invention.
Figure 5:
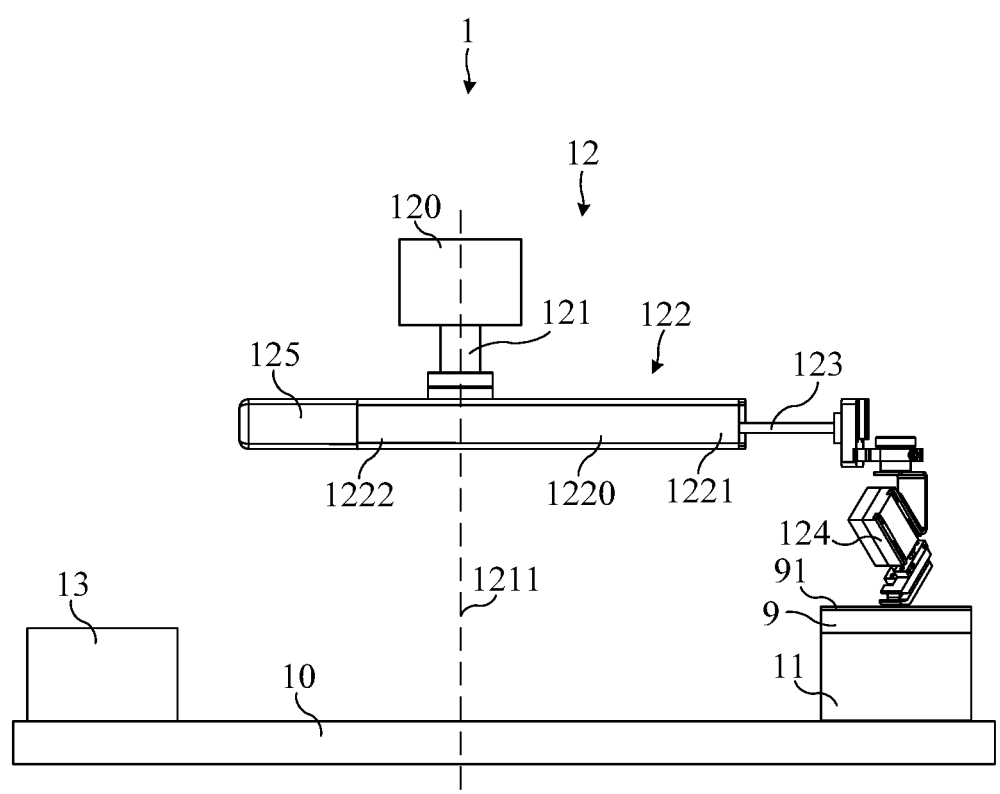
FIG. 5 is a cross-sectional view illustrating the device of FIG. 4.
Figure 6:
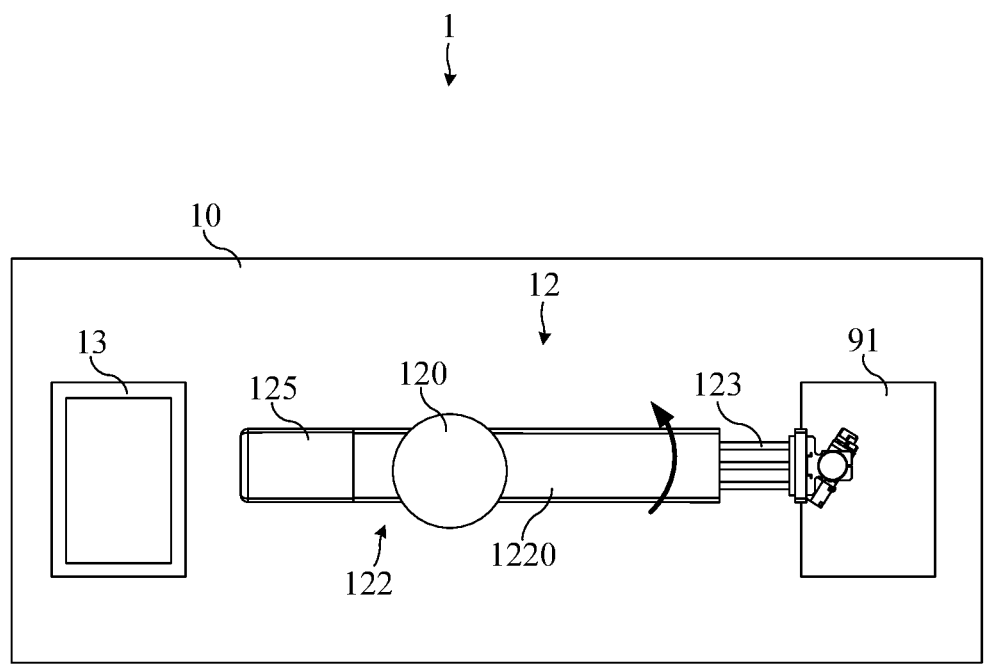
FIG. 6 is a top view illustrating the device of FIG. 4.
Figure 7:
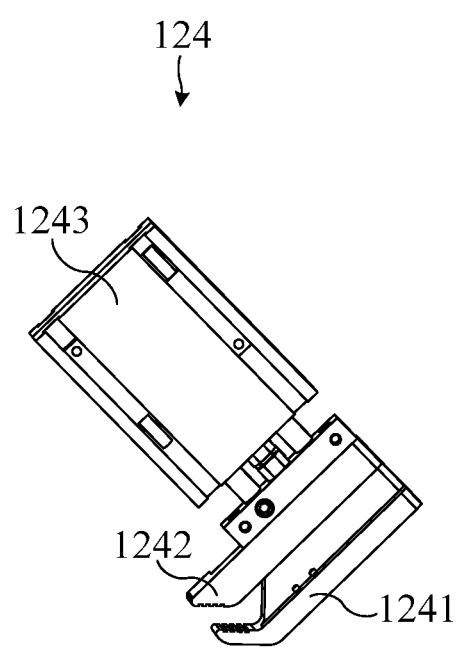
FIG. 7 is a perspective view illustrating the peeling component of the device in FIG. 4.

According to one embodiment, a device to perform the method for peeling off a film covered on an object in FIG. 1 and FIG. 2 is illustrated below. FIG. 4 is a perspective view illustrating a device 1 for peeling off a film covered on an object according to a first embodiment. FIG. 5 is a cross-sectional view of the device 1 in FIG. 4. FIG. 6 is a top view of the device 1 in FIG. 4. FIG. 7 is a perspective view illustrating the peeling component 124 of the device 1 in FIG. 4. As shown in FIG. 1 to FIG. 6, in this embodiment, the device 1 includes a carrying platform 11 and a film peeling assembly 12 located near the carrying platform 11. The carrying platform 11 is configured for carrying an object 9 with a film 91 covered thereon. The film peeling assembly 12 further includes a rotating shaft 121 defining an axis 1211, a variable radius rotating arm 122 connected to the rotating shaft 121 and capable of rotating around the axis 1211, and a peeling component 124 connected to the variable radius rotating arm 122 for picking up the film 91 and peeling off the film 91 from the object 9. The variable radius rotating arm 122 is disposed above the carrying platform 11. The variable radius rotating arm 122 includes a main body 1220 and an expansion rod 123 connected to one end of the main body 1220. The peeling component 124 is mechanically coupled to the expansion rod 123.

Further, the carrying platform 11 is disposed on a base plate 10, and the object 9 is disposed on the carrying platform 11. The carrying platform 11 is arranged to have a shape and size arranged to properly hold the object 9. In this embodiment, the shapes of the carrying platform 11 and the object 9 are rectangular, but they are not limiting. The carrying platform 11 may have a different shape and size according to the shape and size of the object.

Please refer from FIG. 4 to FIG. 6. In this embodiment, the rotating shaft 121 defines an axis 1211, and the rotating shaft 121 is disposed on the left side of the carrying platform 11. The variable radius rotating arm 122 is driven by the rotating shaft 121 to rotate around the axis 1211. The axis 1211 of the rotating shaft 121 corresponds to the fulcrum (a) shown in FIG. 1. The film peeling assembly 12 further includes a motor 120 connected to the rotating shaft 121. The motor 120 could drive the rotating shaft 121 to rotate, and the rotating shaft 121 could drive the variable radius rotating arm 122 to rotate around the axis 1211 above the carrying platform 11. It should be noted that the rotating shaft 121 is disposed above the variable radius rotating arm 122 and the motor 120 is disposed above the rotating shaft 121 in FIG. 1, but these arrangements are not limiting. For example, alternatively, the motor 120 may be disposed on the base plate 10, the rotating shaft 121 may be disposed above the motor 120, and the variable radius rotating arm 122 may be disposed above the rotating shaft 121.

In this embodiment, the main body 1220 includes a first end 1221 and a second end 1222. The expansion rod 123 is mechanically coupled to the first end 1221 of the main body 1220. The expansion rod 123 has a near end connected to the first end of the main body 1222, and a far end connected to the peeling component 124. The distance between the axis 1211 and the far end of the expansion rod 123 defines a rotating radius, and with the rotating radius the peeling component 124 can move along a circular path around the axis 1211. When the variable radius rotating arm 122 rotates with the rotating radius, the far end of the expansion rod 123 generates a circular moving path, and a part of the circular moving path passes above the carrying platform 11. Moreover, when the rotating shaft 121 drives the variable radius rotating arm 122 to rotate around the axis 1211, the expansion rod 123 may extend or retract, so the variable radius rotating arm 122 may rotate with a variable radius around the axis 1211, and the far end of the expansion rod 123 generates a variable circular path. For example, the first force arm R1 is formed when the expansion rod 123 is extended and the length of the expansion rod 123 is L, and the second force arm R2 is formed when the expansion rod 123 is retracted and the length of the expansion rod 123 is less than L. The device 1 may further include a controller (not shown in the figures) configured to control the motor 120 to drive the variable radius rotating arm 122 to rotate around the axis 1211, and to drive the expansion rod 123 to extend or to retract.

In this embodiment, the variable radius rotating arm 122 of the film peeling assembly 12 rotates around the axis 1211 with a variable rotating radius. For example, the film peeling assembly 12 may rotate around the axis 1211 with a first rotating radius and a second rotating radius respectively, where the second rotating radius is shorter than the first rotating radius. The first rotating radius and the second rotating radius corresponds to the first force arm R1 and second force arm R2 in FIG. 3A. When the variable radius rotating arm 122 rotates with the first rotating radius and the second rotating radius respectively, the far end of the expansion rod 123 moves along a first circular path P1 and a second circular path P2 respectively and provides circular traction forces when it moves along the first circular path P1 and the second circular path P2. Furthermore, when the variable radius rotating arm 122 rotates with the first rotating radius, the first circular path has a rotating diameter, and the length of the rotating diameter is greater than the length of the film 91 covered on the object 9.

Moreover, the film peeling assembly 12 includes a counterweight block 125 mechanically coupled to the second end 1222 of the main body 1220. The material, shape and weight of the counterweight block 125 is designed considering the length of the main body 1220, the position of the rotating shaft 121 connected to the main body 1220, and the weights of the expansion rod 123 and the peeling component 124. Therefore, the variable radius rotating arm 122 could rotate around the axis 1211 smoothly, and the stability and peeling efficiency of the peeling component 124 could be increased.

As shown in FIG. 4, FIG. 6 and FIG. 7, in this embodiment, the peeling component 124 is mechanically to the far end of the expansion rod 123. When the main body 1220 of the variable radius rotating arm 122 drives the far end of the expansion rod 123 to rotate and generate the circular path, the peeling component 124 also moves along the circular path. The peeling component 124 includes a fixed finger 1241, a movable finger 1242 and a cylinder 1243. The fixed finger 1241 is disposed opposite to the movable finger 1242, and the movable finger 1242 is connected to the cylinder 1243. The cylinder 1243 can drive the movable finger 1242 to move toward the fixed finger 1241 to clamp. Furthermore, the height of the peeling component 124 corresponds to the height of the object 9, and the clamp position of the fixed finger 1241 and the movable finger 1242 correspond to the position of the film 91 covered on the object 9. Therefore, when the fixed finger 1241 and the movable finger 1242 are clamped to each other, the peeling component 124 could grip the film 91 covered on the object 9. The controller of the device 1 could also control the cylinder 1243 of the peeling component 124.

As shown in FIG. 3A, when the device 1 peels the film 91 covered on the object 9, the peeling component 124 is located on the first circular path P1 and picks up the film 91 on the lift-off position (the bottom end 911). At this time, the peeling component 124 generates the peeling force tangential to the first circular path P1. When the angle between the peeling force and the bottom end 911 of the film 91 is approximately 45 degrees, the controller controls the expansion rod 123 to retract to make the peeling component 124 switch from the first circular path P1 to the second circular path P2. As shown in FIG. 3B, after the peeling component 124 switches from the first circular path P1 to the second circular path P2, the peeling component 124 moves along the second circular path P2. Then, as shown in FIG. 3C, when the peeling component 124 moves along the second circular path P2 and the angle between the peeling force and the bottom end 911 of the film 91 is approximately 135 degrees, the controller controls the expansion rod 123 to extend to make the peeling component 124 switch from the second circular path P2 back to the first circular path P1 (as shown in FIG. 3D). Finally, as shown in FIG. 3E, the peeling component 124 moves along the first circular path P1 to completely peel off the film 91 from the object 9. Therefore, the method for peeling off a film covered on an object of the embodiment could peel off the film on the surface of the object by different peeling stages, to reduce the peeling path and reduce the force required for peeling the film, thereby the peeling time could be reduced and the peeling efficiency could be improved.

Please refer to FIG. 3A, FIG. 4 and FIG. 6. In this embodiment, the device 1 may further include a waste box 13 disposed next to the rotating shaft 121 of the film peeling assembly 12, and part of the first circular path P1 is located above the waste box 13. Moreover, the first circular path P1 includes a dropping position, and the dropping position is located above the waste box 13. As shown in FIG. 4, the waste box 13 may be arranged on the base plate 10 and located on the left side to the rotating shaft 121. That is to say, the waste box 13 and the carrying platform 11 are respectively located on the left side and the right side to the rotating shaft 121 of the film peeling assembly 12. After the peeling component 124 completely peels off the film 91 covered on the object 9, the peeling component 124 continues to move along the first circular path P1 to the dropping position, then the controller controls the peeling component 124 to release the fixed finger 1241 and the movable finger 1242, so the peeled-off film 91 is dropped from the peeling component 124 and falls into the waste box 13. The variable radius rotating arm 122 of the device 1 of the embodiment moves in a circular motion, and the carrying platform 11 and the waste box 13 are located on the circular path defined by a circular motion. Therefore, the device 1 can achieve peeling and dropping the film when the variable radius rotating arm 122 rotates in one round. The variable radius rotating arm 122 does not need to move along an additional path to be repositioned for the next pealing, and does not need to move along another path to drop the peeled-off film. Therefore, the device for peeling off a film covered on an object of the embodiment could peel off the film, and drop the peeled-off film along a circular path in one round. Compared to the prior art, the total path for peeling and dropping the films is shortened, the peeling time and the space required for the operation are reduced. It should be noted that the locations of the waste box and the carrying platform are not limiting to being located opposite to each other; the waste box may also be located on other position on the circular path. For example, the waste box may be located on the second circular path.

The peeling component 124 moves along the first circular path P1 in a first direction (for example, a counter-clockwise direction from the top view perspective) to pick up the film 91 on the lift-off position, grip the film 91 and move along a path changing from the first circular path P1 to the second circular path P2 in the first direction, continue to grip the film 91 and move along a path changing from the first circular path P1 to the second circular path P2 in the first direction to completely peel off the film from the object 9, and then continue to move along the first circular path P1 in the first direction to drop the peeled-off film 91 at the dropping position. When the device 1 needs to peel another film covered on the next object, the peeling component 124 may continue to move in the first direction and returns to the lift-off position to pick up the film. Therefore, the peeling component 124 of the device 1 may move along the first circular path, the second circular path and the first circular path in sequence to achieve effective film peeling process.

Figure 8:
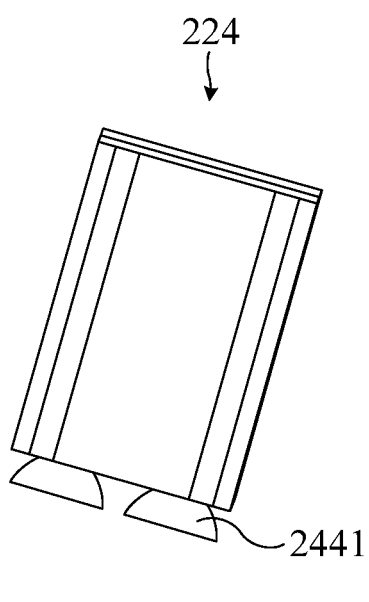
FIG. 8 is a perspective view illustrating the peeling component of the device according to a second embodiment of the present invention.

The peeling component of the device of the embodiment may also be in other forms. Please refer to FIG. 8. FIG. 8 is a perspective view illustrating the peeling component 224 of the device according to a second embodiment of the present invention. As shown in FIG. 8, in this embodiment, the peeling component 224 has suckers 2441 for sucking up the film covered on the object. The suckers 2441 of the peeling component 224 may be mechanically coupled to a vacuum device (not shown in figure). When the device peels the film, the controller turns on the vacuum device to make the peeling component suck up the film at the lift-off position and control the peeling component 224 to move along the first circular path, the second circular path, and back to the first circular path to peel the film. Furthermore, when the peeling component 224 peels the film and moves along the first circular path to the dropping position, the controller may turn off the vacuum device to make the film dropped from the peeling component 224 and fall into the waste box.

Figure 9:
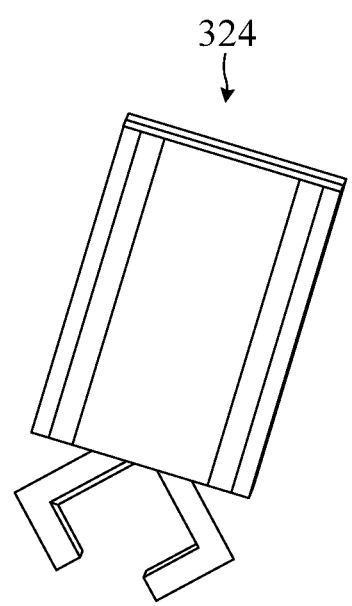
FIG. 9 is a perspective view illustrating the peeling component of the device according to a third embodiment of the present invention.

Please refer to FIG. 9. FIG. 9 is a perspective view illustrating the peeling component 324 of the device according to a third embodiment of the present invention. As shown in FIG. 9, in this embodiment, the peeling component 324 includes a gripper for gripping the film covered on the object. The peeling component 324 may be a machine gripper or an electric gripper. When the device peels the film, a controller may control the gripper to clamp the film at the lift-off position and control the peeling component 324 to move along the first circular path, the second circular path, and back to the first circular path to peel the film. Furthermore, when the peeling component 324 peels off the film and moves along the first circular path to the dropping position, the controller could release the gripper to make the film dropped from the peeling component 324 and fall into the waste box 13.

In summary, the method and device for peeling off a film covered on an object of the embodiments according to the present invention may switch between different circular paths with variable rotation radius depending on different peeling stages to peel off the film covered on the object. With the arrangement demonstrated by the embodiments, the peeling path is shortened, the force required for peeling off the film and thus the risk of product displacement is reduced, and therefore the peeling time and efficiency is improved. Moreover, the device for peeling off a film covered on an object of the embodiments according to the present invention may peel off the film and drop it in a single round along a near circular path, so the total path is short and the configuration of the components is more compact, and the peeling time and required space for operation are also reduced.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A device for peeling off a film covered on an object, comprising:
   a carrying platform, configured for carrying the object; and
   a film peeling assembly, comprising a single rotating shaft defining an axis, a variable radius rotating arm connected to the rotating shaft and capable of rotating around the axis, and a peeling component connected to the variable radius rotating arm to pick up the film on a lift-off position of the film;
   wherein the variable radius rotating arm is driven by the rotating shaft to rotate around the axis, so as to drive the peeling component to apply a circular traction force with a variable radius to peel off the film from the object;
   wherein the variable radius rotating arm comprises a main body and an expansion rod connected to a first end of the main body;
   wherein the expansion rod has a near end connected to the first end of the main body, and a far end connected to the peeling component, and the rotating shaft drives the variable radius rotating arm to rotate around the axis, the expansion rod extends or retracts to generate a variable radius circular path.

2. The device of claim 1, further comprising a counterweight block configured on a second end of the main body, and the axis is located between the first end and the second end of the main body, the counterweight block is used for maintaining the variable radius rotating arm to rotate around the axis smoothly.

3. The device of claim 1, wherein the variable radius comprises a first rotating radius and a second rotating radius shorter than the first rotating radius, the variable radius circular path comprises a first circular path and a second circular path, the variable radius rotating arm rotates with the first rotating radius and the second rotating radius respectively to generate the first circular path and the second circular path, the peeling component moves along the first circular path, the second circular path and the first circular path in sequence to peel the film, and the lift-off position is located on the first circular path.

4. The device of claim 3, wherein the peeling component switches from the first circular path to the second circular path when the angle between the circular traction force and the film is approximately 45 degrees, and the peeling component switches from the second circular path to the first circular path when the angle between the circular traction force and the film is approximately 135 degrees.

5. The device of claim 1, wherein the peeling component includes a sucker for sucking up the film.

6. The device of claim 1, wherein the peeling component includes a gripper for gripping the film.

7. The device of claim 1, wherein the peeling component comprises a fixed finger, a movable finger and a cylinder, the fixed finger is configured opposite to the movable finger, and the movable finger is connected to the cylinder, the movable finger is capable of moving towards the fixed finger to grip the film.

8. The device of claim 1, wherein the variable radius includes a first rotating radius changing to a second rotating radius shorter than the first rotating radius.

9. The device of claim 1, wherein the variable radius includes a second rotating radius changing to a first rotating radius, and the second rotating radius shorter than the first rotating radius.

10. The device of claim 1, wherein the variable radius includes a first rotating radius changing to a second rotating radius shorter than the first rotating radius, and changing back to the first rotating radius.

\* \* \* \* \*